(12) United States Patent
Sirwardane (10) Patent No.: US 6,908,497 B1
(45) Date of Patent: Jun. 21, 2005

(54) SOLID SORBENTS FOR REMOVAL OF CARBON DIOXIDE FROM GAS STREAMS AT LOW TEMPERATURES

(75) Inventor: Ranjani V. Sirwardane, Morgantown, WV (US)

(73) Assignee: The United States of America as represented by the Department of Energy, Washington, DC (US)

( * ) Notice: Subject to any disclaimer, the term of this patent is extended or adjusted under 35 U.S.C. 154(b) by 0 days.

(21) Appl. No.: 10/420,713

(22) Filed: Apr. 23, 2003

(51) Int. Cl.[7] .................. B01D 53/04; B01D 53/52; B01D 53/62
(52) U.S. Cl. ................ 95/136; 95/139; 95/148; 96/154; 423/230; 502/405
(58) Field of Search .............. 95/136, 139, 148, 95/900; 96/108, 153, 154; 423/203, 228–230; 502/400, 405

(56) References Cited

U.S. PATENT DOCUMENTS

| | | | | | |
|---|---|---|---|---|---|
| 2,818,323 | A | * | 12/1957 | Haensel | 423/228 |
| 4,786,294 | A | * | 11/1988 | Jonqueres et al. | 95/115 |
| 4,810,266 | A | | 3/1989 | Zinnen et al. | |
| 5,061,455 | A | * | 10/1991 | Brose et al. | 96/122 |
| 5,087,597 | A | | 2/1992 | Leal et al. | |
| 5,231,063 | A | * | 7/1993 | Fukumoto et al. | 502/62 |
| 5,366,719 | A | | 11/1994 | van Wingerden et al. | 423/659 |
| 5,376,614 | A | * | 12/1994 | Birbara et al. | 502/402 |
| 5,492,683 | A | | 2/1996 | Birbara et al. | |
| 5,609,842 | A | * | 3/1997 | Tsybulevski et al. | 423/244.11 |
| 5,876,488 | A | | 3/1999 | Birbara et al. | |
| 5,882,622 | A | * | 3/1999 | Easley et al. | 423/600 |
| 6,004,522 | A | * | 12/1999 | England | 423/230 |
| 6,364,938 | B1 | * | 4/2002 | Birbara et al. | 95/139 |
| 6,429,170 | B1 | * | 8/2002 | Dodwell | 502/400 |
| 6,500,237 | B2 | * | 12/2002 | Winchester et al. | 95/117 |
| 6,547,854 | B1 | * | 4/2003 | Gray et al. | 95/139 |
| 2002/0083833 | A1 | * | 7/2002 | Nalette et al. | 95/139 |
| 2002/0178915 | A1 | * | 12/2002 | Shore et al. | 95/136 |
| 2003/0032555 | A1 | * | 2/2003 | Dodwell | 502/400 |
| 2003/0075050 | A1 | * | 4/2003 | Kato et al. | 96/108 |

OTHER PUBLICATIONS

"Reversible Adsorption of Carbon Dioxide on Amine Surface–Bonded Silica Gel", Elsevier Science S. A, 184–189 Leal, et al., Mar. 1995.

* cited by examiner

Primary Examiner—Robert H. Spitzer
(74) Attorney, Agent, or Firm—Joy Alwan; Thomas G. Anderson; Paul A. Gottlieb

(57) ABSTRACT

New low-cost $CO_2$ sorbents are provided that can be used in large-scale gas-solid processes. A new method is provided for making these sorbents that involves treating substrates with an amine and/or an ether so that the amine and/or ether comprise at least 50 wt. percent of the sorbent. The sorbent acts by capturing compounds contained in gaseous fluids via chemisorption and/or physisorption between the unit layers of the substrate's lattice where the polar amine liquids and solids and/or polar ether liquids and solids are located. The method eliminates the need for high surface area supports and polymeric materials for the preparation of $CO_2$ capture systems, and provides sorbents with absorption capabilities that are independent of the sorbents' surface areas. The sorbents can be regenerated by heating at temperatures in excess of 35° C.

20 Claims, 10 Drawing Sheets

Figure 4
Sorption of CO2 on DEAB as a function of time
(15% CO2, 3% O2, 82% N2, saturated with water vapor, 1 atm, 5 cc/min, 25C)

Figure 5 Sorption of CO2 on MEAB as a function of time
(15% CO2, 3% O2, 82% N2, saturated with water vapor, 1 atm, 5 cc/min, 25 C)

Figure 7
Adsorption Isotherms of Polyethylene Glycol Dimethyl Ether

Figure 9

Effect of Regeneration Temperature on CO2 Adsorption of DEAB Sorbent

SOLID SORBENTS FOR REMOVAL OF CARBON DIOXIDE FROM GAS STREAMS AT LOW TEMPERATURES

CONTRACTUAL ORIGIN OF INVENTION

The United States Government has rights in this invention pursuant to an employer-employee relationship between the inventor and the U.S. Department of Energy.

BACKGROUND OF THE INVENTION

1. Field of the Invention

The invention relates to a method for the preparation of sorbents for treatment of industrial effluent gases, and, more specifically, this invention relates to a method for the preparation of amine and glycol-based sorbents for the removal of carbon dioxide ($CO_2$) from the atmosphere or $CO_2$ generated from other sources such as power plants.

2. Background of the Invention

Fossil fuels supply more than 98% of the world's energy requirements. The combustion of fossil fuels, however, is one of the major sources of the greenhouse gas, $CO_2$. The ability to efficiently and safely absorb $CO_2$ is important in the development and application of cost-effective technologies for $CO_2$ removal from gas streams.

Separation and capture processes of $CO_2$, as those processes relate to ocean and/or geologic sequestration, have been identified as a high-priority research topic in Department of Energy (DOE) reports. The costs of separation and capture, including compression to the required $CO_2$ pressure for the sequestration step, are generally estimated to comprise about three-fourths of the total cost of ocean or geologic sequestration. An improvement of the separation and capture of $CO_2$ will reduce the total cost required for sequestration.

$CO_2$ absorption processes using aqueous amine solutions facilitate the removal of $CO_2$ from gas streams in some industries. These processes often are referred to as wet chemical stripping.

Wet chemical stripping of $CO_2$ involves one or more reversible chemical reactions between $CO_2$ and amine substances to produce a liquid species, such as a carbamate. Upon heating, the carbamate breaks down to free $CO_2$ with the original amine regenerated to subsequently react with additional $CO_2$. An example of the process is given by Equation 1:

Equation 1

The two moieties represented by R may be either any alkyl moiety, any aryl moiety, or any combination thereof. At high $CO_2$ concentrations, bicarbonate formation may also take place. Where R is an ethanolic moiety (i.e., in the presence of the reactant monoethanolamine (MEA) as shown infra), the reaction proceeds as follows:

Equation 2

Typically, these amines, MEA and DEA, are used as 25 to 30 wt. % amine in aqueous solution. The amine solution enters the top of an absorption tower while the carbon dioxide containing gaseous stream is introduced at the bottom. During contact with the $CO_2$-containing gaseous stream, the amine solution chemically absorbs the $CO_2$ from the gaseous stream to create a carbamate. Conversion of carbamate ion back to $CO_2$ proceeds through a thermal regeneration process, typically at a temperature of about 120° C. Carbon dioxide and water emerge from the amine solution and the water is separated via condensation using a heat exchanger. After regeneration, the amine solution is recycled back to the absorption tower for additional $CO_2$ absorption.

Carbon dioxide capture and regeneration in the above-described manner requires high temperatures. As such, the process outlined supra is energy intensive. Further, the amine solution has a limited lifetime due to degradation through oxidation of the amine. In addition, high amine concentrations and high $CO_2$ loadings exacerbate corrosion problems of process equipment.

Solid sorbents serve as alternatives to wet chemical stripping via the formation of carbamate species. However, solid sorbents' absorption capabilities are limited by their respective surface areas inasmuch as only the sorbent's surface is treated with $CO_2$-reactive compounds such as an amine or an ether. Since only the surface is involved in the reaction, a very limited quantity of $CO_2$-reactive material can be incorporated in the sorbent solid by either surface modification or solid impregnation techniques. This severely restricts the amount of gases such as $CO_2$ that can be absorbed by the sorbents currently present in the art and gives rise to short breakthrough times. The breakthrough time is that amount of time by the end of which the sorbent is saturated with the gas being absorbed, after which that gas's concentration level in effluent gas begins to rise.

Several solid sorbents have recently been utilized to remove $CO_2$ from enclosed environments. Important considerations include the ability to regenerate an absorbent and the ease of its regeneration. Efforts have been made to reversibly adsorb $CO_2$ on a silica gel first modified with amine. O. Leal, et al., *Inorganica Chimica Acta*, 240, 183–189, 1995. Surface modification occurs when the hydroxyl moieties of the silica gel surface bonds with chemical moieties. When the chemical moiety is 3-aminopropyltriethoxysilane, bonding occurs between the oxygen atoms of the ethoxy moieties and silicon atoms at the surface of the gel. It is this surface modification that facilitates adsorption of $CO_2$ via the formation of carbamate species.

U.S. Pat. Nos. 5,876,488 and 5,492,683 both awarded to Birbara, et al. on Mar. 2, 1999, and Feb. 20, 1996, respectively, disclose a method for incorporating liquid amines onto the surface of a support substrate that has a surface area greater than 50 square meters per gram ($m^2/g$). The reaction is restricted to the surface and the method requires materials that have high surface areas.

U.S. Pat. No. 5,087,597 awarded to Leal, et al. on Feb. 11, 1992 discloses a method for the chemisorption of $CO_2$ at room temperature using a silica gel having a surface area of between 120 and 240 $m^2/g$. The gel has been modified with a polyalcoxisilane containing one or more amino moieties in its structure.

U.S. Pat. No. 4,810,266 awarded to Zinnen et al. on Mar. 7, 1989 discloses a method for $CO_2$ removal using animated carbon molecular sieves that have been treated with alcohol amines.

None of the aforementioned patents discloses a sorbent with an absorption capacity independent of the sorbent's surface area nor any method or process for fabricating such a sorbent.

A need exists in the art for a process to produce sorbents with wide capabilities in cold-gas cleanup. In addition, there is a need for a sorbent which incorporates a much higher weight percentage of the $CO_2$-reactive moiety into the sorbent support phase thus giving rise to a greater absorption capability and breakthrough time for $CO_2$. Further, incorporation of the reactive moiety into the support phase will avoid the corrosion and evaporation problems inherent with use of state of the art reactive organic liquids/solids, now present in the art, such as corrosion, and evaporation. In particular, there is a need for sorbents whose absorption capabilities are independent of their surface areas. In addition, the sorbent should be easily regenerated at ambient to moderate temperatures for use in additional absorption/desorption cycles. Finally, the materials used in sorbent preparation should be inexpensive.

SUMMARY OF INVENTION

An object of the present invention is to provide a method for synthesizing amine-enriched sorbents that overcomes many of the disadvantages of the prior art.

Another object of the present invention is to provide a new method for synthesizing amine-enriched sorbents. A feature of the invention is the elimination of the need for organic solvents and polymeric materials for the preparation of $CO_2$ capture systems. An advantage is that the new method is inexpensive.

Still another object of the present invention is to provide a method for creating many different $CO_2$ absorbing materials using solid substrates whereby more than just the external surfaces of the substrates are utilized as reaction sites. A feature of the invention is the suitability of a large selection of solid substrates such as clays and amine-based and/or ether-based compounds as absorbing material building blocks. An advantage of the invention is that a greater range of $CO_2$ absorbing capabilities can be provided.

Yet another object of the present invention is to provide a method which produces sorbents which absorb over a range of temperatures. A feature of the invention is that the sorbents provided by this method adsorb $CO_2$ from as low as 25° C. via a combination of both physical and chemical adsorption processes. An advantage of the invention is that these sorbents can adsorb at temperatures well above normal ambient temperatures, and retain the absorbed gases at these temperatures.

Still another object of the present invention is to provide a method which gives a sorbent which is easily regenerated through many cycles. A feature of the invention is that regeneration of the sorbent can be accomplished in an anhydrous environment such as one comprised primarily of nitrogen gas. Regeneration also can be accomplished by heating above 35° C. in a vacuum. An advantage of the invention is that the regeneration process is inexpensive.

Yet another object of the present invention is to provide a method which produces thermally stable sorbents. A feature of the invention is that the sorbents provided by this method can be heated to temperatures above 50° C. with little or no degradation. An advantage of the invention is that these sorbents have a longer life span of usefulness, resulting in lower costs.

Still another object of the present invention is to provide a method which produces sorbents wherein the reactive material is incorporated within the sorbent and not just on the surface of the sorbent. A feature of the invention is that the sorbents produced by this method absorb gases at sites within the sorbent itself and not just on the surface. An advantage of the invention is that the absorption capacities of these sorbents are independent of their respective surface areas, and, accordingly, the absorption capacities are greatly enhanced.

Briefly, the invention provides a process for producing enriched sorbents, the process comprising supplying a substrate having repeating strata and interstices between the strata, whereby the interstices define conduits which are in fluid communication with the atmosphere surrounding the substrate; causing the interstices to expand; coating the strata with a polar nucleophilic moiety; and drying the coated strata.

The invention also provides a method for removing compounds from a fluid, the method comprising contacting the fluid with a polar nucleophilic moiety located on inside surfaces and outside surfaces of a substrate, whereby the moiety attracts the compounds.

Also provided is a sorbent comprising a substrate with external surfaces and internal surfaces in fluid communication with the environment; and polar nucleophilic moieties covering said surfaces to allow interaction of the moieties with compounds in the environment.

BRIEF DESCRIPTION OF DRAWINGS

The invention together with the above and other objects and advantages will be best understood from the following detailed description of the preferred embodiment of the invention shown in the accompanying drawings, wherein.

DETAILED DESCRIPTION OF THE INVENTION

The invented process provides for dispersal of reactant moieties throughout an adsorbent structure. This produces sorbents such that their absorption capabilities depend upon their total volumes rather than just their surface areas.

The invented process can be used to prepare a variety of different sorbents and is conducted at ambient temperatures. In addition, the instant invention provides a process for the preparation of dry amine- and/or alcohol-based sorbents for the capture and separation of gases such as $CO_2$ and hydrogen sulfide ($H_2S$) from gas streams.

In the solid or nonaqueous phase, primary and secondary amines react with $CO_2$ in a two-step sequence, forming first a zwitterion, which then transfers a proton to an un-ionized amine moiety, forming the corresponding carbamate according to Equations 3 and 4:

Equation 3

Equation 4

Amines react with $H_2S$ according to Equations 5 and 6:

Equation 5

Equation 6 where R in Equations 3 through 6 is an aliphatic or aromatic moiety each with or without a hydroxyl (—OH) attached.

$H_2S$ does not have a direct chemical reaction with ethers, but is soluble in ethers.

Sorbent Detail

Figure 1A:
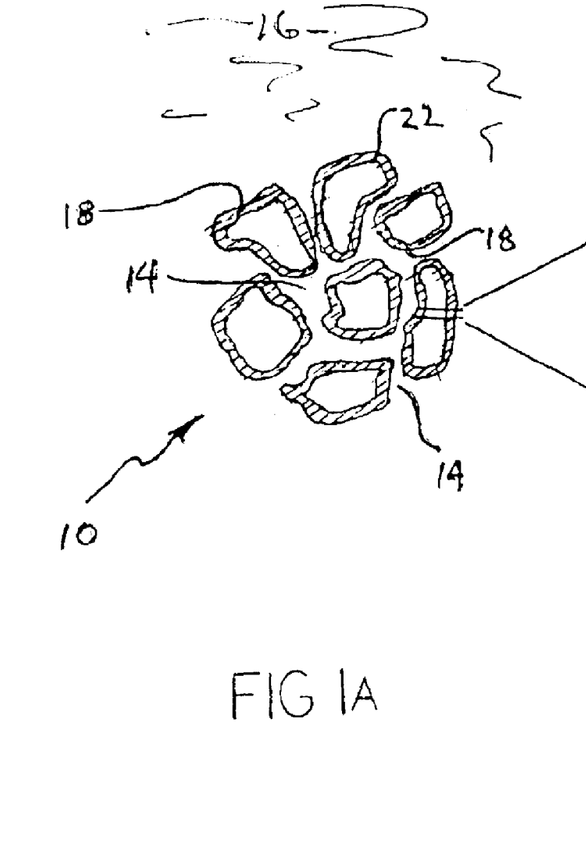
FIGS. 1A–1B are schematic diagrams of the invented absorbent constructs, in accordance with features of the prsent invention.
Figure 1B:
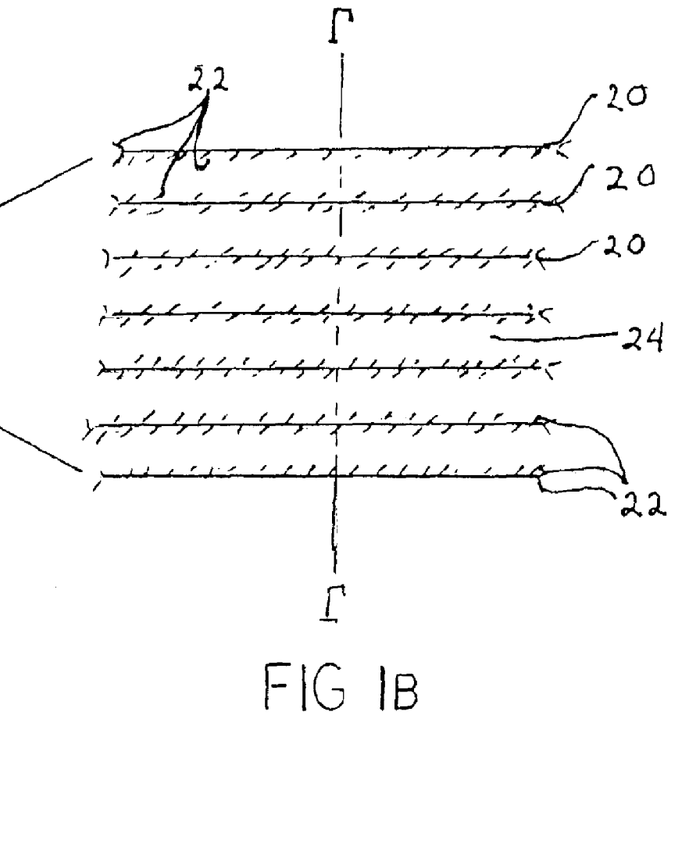

Solid sorbents are prepared utilizing substrates and organic liquids/solids that are reactive chemically and/or physically with $CO_2$ and $H_2S$. Portions of substrates are homogeneously mixed with organic liquids/solids and binding materials, then heated. The resulting construct is depicted as 10 in FIG. 1A. Solid pellets naturally form, of a size from about 1 to 3 millimeters (mm). As depicted in FIG. 1A, these resulting pellets 10 or constructs comprise binding materials thoroughly mixed and interconnected with the organic material 22 throughout the structure of the pellet or construct. As mentioned supra, the construct contains pores 14 which are physically interconnected to create conduits within the construct. Thus, the fluids 16 in the atmosphere surrounding the construct and which contain target compounds to be sequestered or absorbed can diffuse into the pores of the construct to interact with, and be reversibly bound to the polar nucleophilic moiety in an electrostatic manner.

Surprisingly and unexpectedly, the inventor has found that more than 50% of the reactive material weight (e.g., MEA) is incorporated into interlayers of the solid sorbent. Therefore, the reaction or dissolution of the gas to be absorbed is not limited to the surface of the solid.

Polar organic liquids 22 can enter between unit layers 20 of substrates, thereby causing the lattice structure to expand. One suitable substrate is bentonite, an inert mineral silicate whose main constituent is montmorillinite. Bentonite consists of continuous layers 20 of silica sheets. For example, the c-axis's dimension, Γ, of the montmorillinite in bentonite may expand from 9.6 Å to an almost complete separation in the presence of polar liquids. The target material to be absorbed is captured between these unit layers, and also on the sorbent surface 18, by reaction with or dissolution in the polar organic liquid 22.

The polar organic liquid 22 is contained within the interlayers 20. There are pores 24 within each particle and pores 14 exist between particles when the particles are agglomerated to define a pellet. Finally, pores exist at the external surface of the pellet to facilitate physical and chemical communication between the interior of the pellet and the atmosphere surrounding the pellet. This phenomenon provides a salient feature of the instant invention which is that the absorption properties of the amine and/or ether sorbents produced by the process are independent of their surface areas.

The operational temperature range for these sorbents is from about 25° C. to 50° C. The sorbents can be regenerated at temperatures above 35° C.

The process for producing an amine and/or ether-enriched sorbent comprises first, adding an amine and/or an ether to a substrate, mixing the amine and/or the ether and the substrate, and drying the product formed. As described supra, the interaction between the amine and $CO_2$ in the instant invention is a chemical reaction which forms a carbamate. At high $CO_2$ concentrations, however, bicarbonates are also formed, or may be formed exclusively. The reaction between the amine and $H_2S$ is similar except that the presence of water vapor is not critical for the reaction between the two moieties to take place.

The amine is a primary amine, a secondary amine, a tertiary amine, an aromatic amine, or a cyclic amine. The substituted amine contains one or more moieties selected from the group consisting of methyl, ethyl, n-propyl, isopropyl, n-butyl, isobutyl, t-butyl, allyl, vinyl, cyclopentyl, cyclohexyl, phenyl, naphthyl, and combinations thereof.

The ether contains one or more moieties selected from the group consisting of methyl, ethyl, n-propyl, isopropyl, n-butyl, isobutyl, t-butyl, allyl, vinyl, cyclopentyl, cyclohexyl, phenyl, naphthyl, ethylene glycol, polyethylene glycol, and combinations thereof.

The moieties attached to the amine nitrogen and the ether oxygen may contain one or more hydroxyl moieties attached to one or more moiety carbon atoms. The presence of hydroxyl groups in the moieties attached to the amine nitrogen or the ether oxygen may accelerate or enhance the $CO_2$ capture process.

Substrate Detail

The sorbent is prepared utilizing substrates capable of providing reaction surfaces on other than the external surfaces of the substrate. These substrates are homogeneously and thoroughly mixed with inorganic and organic liquids/solids that are reactive with gases such as $CO_2$. Preferable organic/liquids and solids come from the group comprising, but not limited to, amines and ethers The organic liquids and organic solids comprise at least 50 wt. percent of the sorbent. The organic moieties are present in a moiety-to-substrate weight ratio ranging from 1:9 to 3:2.

The resulting substrate serves as a plurality of internally- and externally-situated reaction sites to facilitate reaction of the type depicted in Equations 3 through 6.

Generally, surface areas of the substrates, after treatment with moiety, range from 0.72 m²/g to 26 m²/g.

Generally, any substrate that can accommodate a plurality of reaction sites within its confines is suitable. For example, a solid that has a layered structure which can expand to allow polar molecules to reside therein, is suitable. Clays make excellent substrates for the sorbents of the instant invention. Clays have an ability to retain a large quantity of polar liquids such as water and amines between their unit layers, thereby causing the clay lattice to expand to provide internal reaction cavities. Clays other than bentonite can be used. Other possible clays for use include, but are not necessarily limited to, ball clay, fuller's earth, kaolin, attapulgite, hectorite, meerschaum, palygorskite, saponite, sepiolite, common clay, and fire clay. Some clays may swell more than others, thus having greater absorption capacities. Some clays may be able to contain or otherwise accommodate a greater volume of polar liquids than others.

Anhydrous calcium sulfate ($CaSO_4$) dessicant of a particle size of 20 to 40 mesh is used for some of the example sorbents described infra. Anhydrous calcium sulfate desiccant with a particle size greater than 50 microns can also be used. The anhydrous calcium sulfate desiccant is added to greatly improve porosity for gas diffusion within the pellet. The porosity produced is fairly consistent from sorbent to sorbent. The surface area of the clay, bentonite, is 26 m²/g. On the other hand, the surface area of one batch of the DEAB sorbent was 0.72 m²/g.

Other inert materials for use to enhance porosity of the instant sorbents iriclude, but are not limited to silica, ($SiO_2$), alumina ($Al_2O_3$), calcium silicate ($Ca_2SiO_4$), zirconia ($ZrO_2$), and calcium aluminate ($CaAl_2O_4$).

Calcium sulfate dihydrate ($CaSO_4.2H_2O$) is added to increase the binding ability of the composite of the materials.

The following examples are for illustrative purposes only.

EXAMPLE A

Twenty grams (g) of bentonite, 8 grams of calcium sulfate dihydrate, and 3 grams of anhydrous white (not cobalt-impregnated) calcium sulfate desiccant (20 to 40 mesh) (the latter also known as Drieritem) were homogeneously mixed in a mixer. Twenty grams of diethanol amine (DEA) were mixed with 6.5 g of ethylene glycol monoethylether and 2 milliliters (mLs) of water. Twenty mLs of this liquid mixture was added slowly to the solid mixture while stirring to create a homogeneous mixture having the same consistency throughout. Eventually, pellets naturally formed. The pellets were dried in an oven for one hour at 60° to 80° C.

EXAMPLE B

Bentonite, calcium sulfate dihydrate, and anhydrous calcium sulfate desiccant were combined as in Example A. Twenty-five grams of monoethanolamine (MEA) were mixed with 2 mLs of water and the entire liquid mixture added to the solid mixture, while stirring, until pellets formed. The pellets were dried as before.

EXAMPLE C

Bentonite, calcium sulfate dihydrate, and anhydrous calcium sulfate desiccant were combined as before. Twenty grams of diisopropanol amine (DPA), 2 mLs of water, and 20 mLs of ethanol were mixed. The resulting mixture was allowed to stand for 10 minutes until part of the solvent had evaporated. The liquid mixture was slowly added to the solid mixture while stirring. Pellets formed and were dried as before.

EXAMPLE D

Twenty-eight grams of bentonite and 3 g of anhydrous calcium sulfate desiccant (20 to 40 mesh) were mixed as before. Twenty-five g of polyethylene glycol dimethyl ether (PEGDL) and 2 mLs of water were added. Mixing and drying were carried out as indicated supra.

The PEGDL does not react chemically with gases to be sorbed, but instead interacts physically with said gases and, in effect, dissolves them.

Sorbent Tests

All sorbents were tested in an atmospheric flow microreactor (Micromeritics Autochem 2910, Norcross, Ga.). Sorbents were placed in the flow microreactor and a gas mixture was introduced to the sorbent at 25° C. and at a total flow rate of 5 cubic centimeters per minute (cc/min). The gas mixture was 15% volume (v) $CO_2$, 3% v $O_2$, and 82% v $N_2$, and was bubbled through water at 25° C., to saturate the gaseous mixture with water vapor, before the gaseous mixture was introduced to the sorbent. The outlet gaseous mixture was analyzed by a Pfeiffer Vacuum Thermostar mass spectrometer (Nashua, N.H.).

For all sorbent tests described infra, "breakthrough" of $CO_2$ was defined as having a minimum $CO_2$ gas concentration of ~1% v of the outlet gas coming from above the sorbent in use. Inlet $CO_2$ gas concentrations used were typically ~15% v of the total gas volume passed over the sorbents.

As shown infra, the sorbents preferentially absorb $CO_2$ over $N_2$ and should do the same for $H_2S$ over $N_2$.

1. Diethanolamine Bentonite (DEAB)

Figure 2:
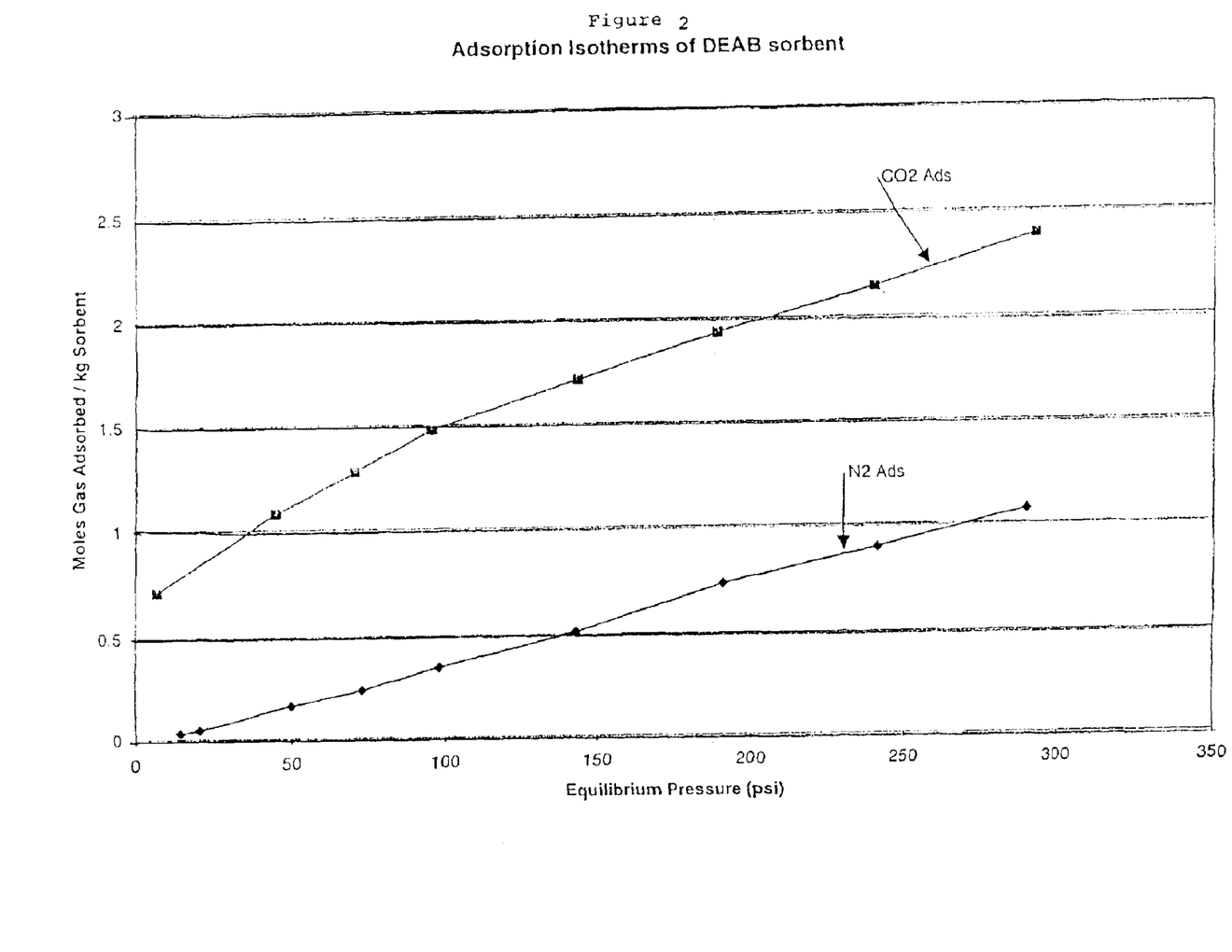
FIG. 2 is a graph of the adsorption isotherms of pure $CO_2$ and pure $N_2$ over a sorbent, diethanolamine bentonite (DEAB), as a function of equilibrium pressure, in accordance with features of the present invention.
Figure 3:
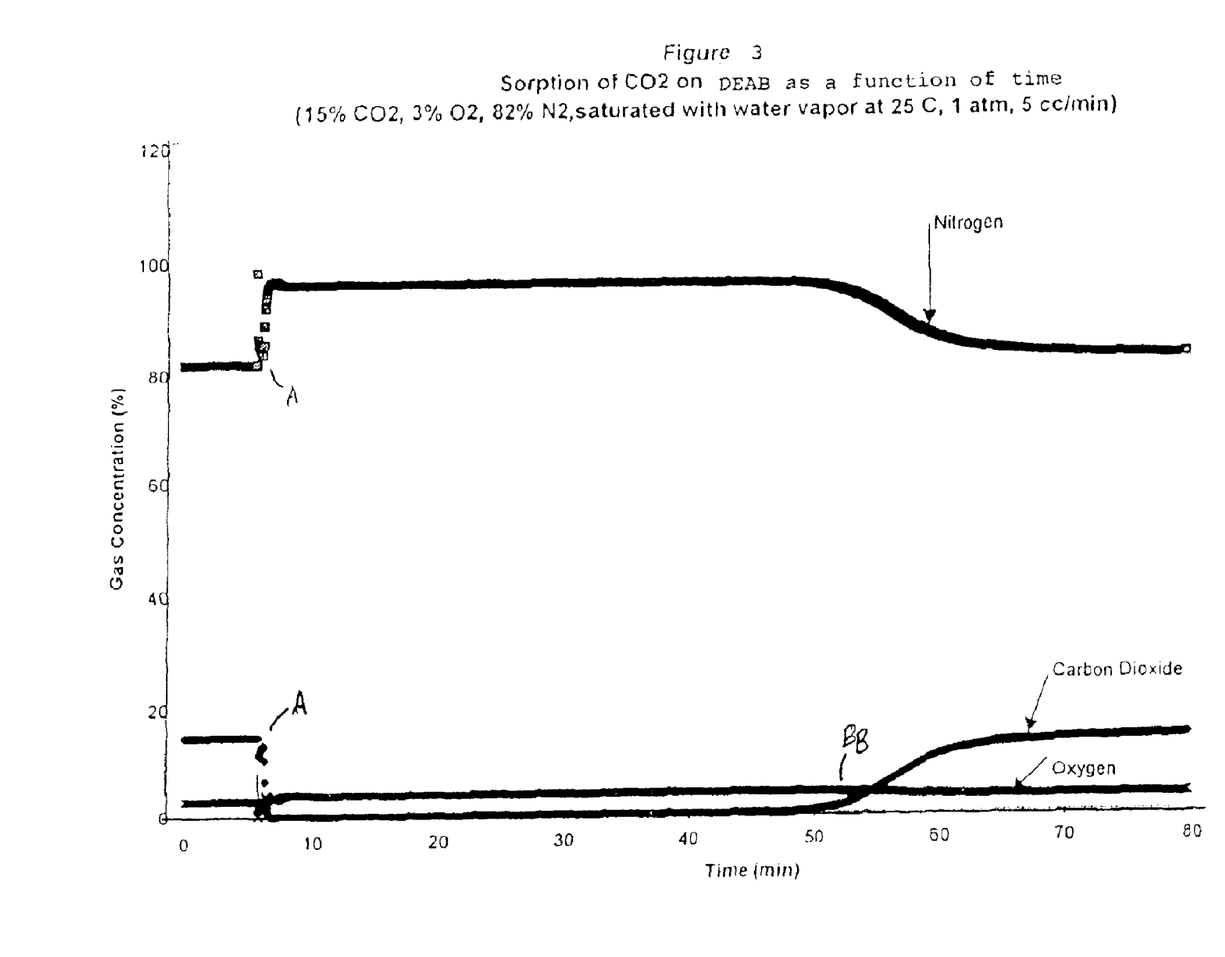
FIG. 3 is a graph of the concentration of $CO_2$, $N_2$, and $O_2$ over a sorbent, diethanolamine bentonite (DEAB), as a function of time, in accordance with features of the present invention.
Figure 4:
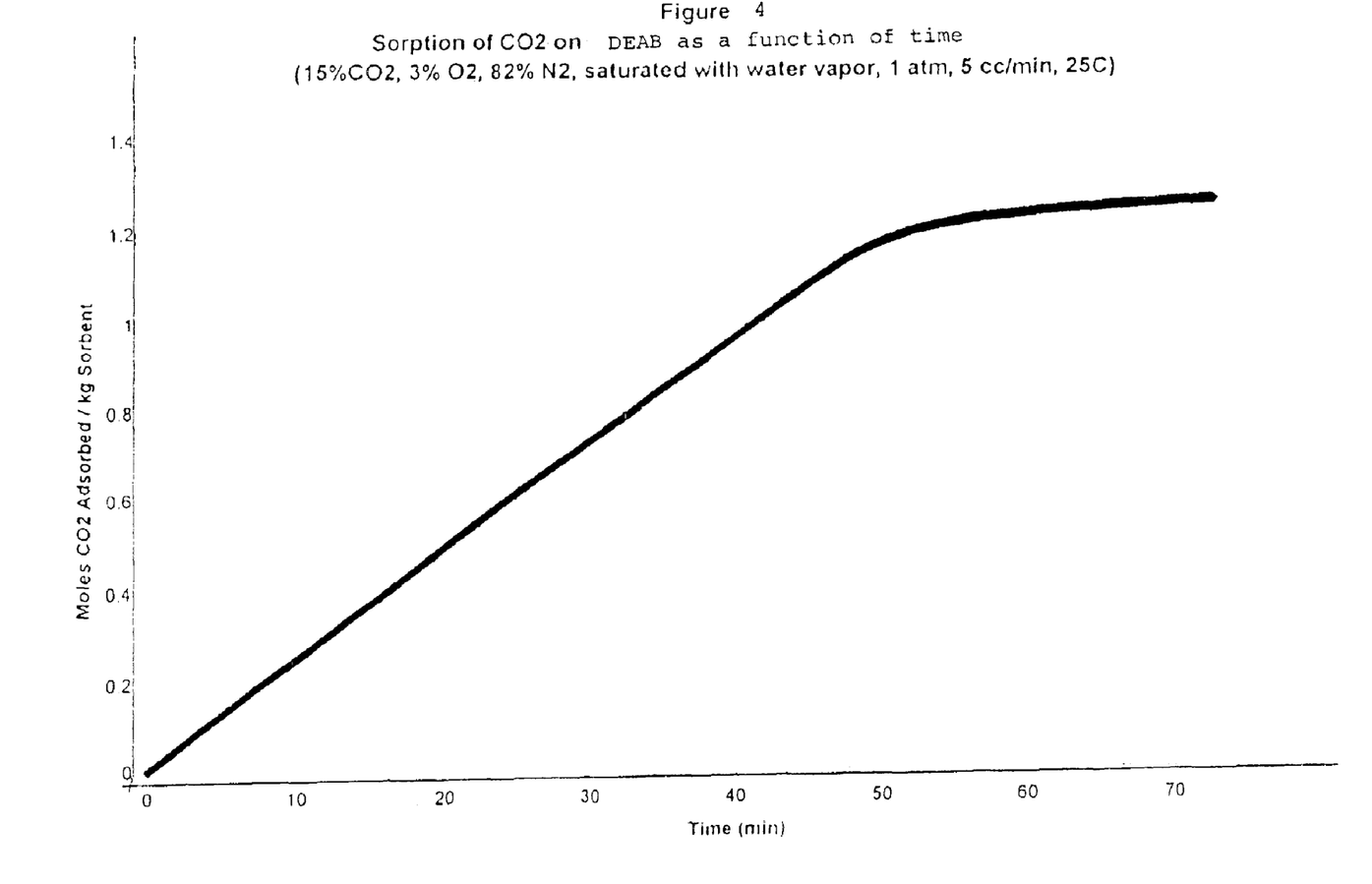
FIG. 4 is a graph of the amount of $CO_2$ captured (calculated from the data presented in FIG. 3) in the presence of the sorbent, diethanolamine bentonite (DEAB), as a function of time, in accordance with features of the present invention.

The amount of DEAB sorbent used for the data presented in the three subsequent figures was 1.16 grams (g).

FIG. 2 is a graph of the adsorption isotherms of pure $CO_2$ and pure $N_2$ over a sorbent, diethanolamine bentonite (DEAB), in moles of gas absorbed per kilogram (kg) of sorbent, as a function of equilibrium pressure. The upper curve is for pure carbon dioxide, the lower curve for pure nitrogen. As the equilibrium pressure is increased the moles of gas absorbed per kg of sorbent increases. As the equilibrium pressure becomes greater, near the end of the two curves, the slopes of the curves decrease due to oncoming saturation of the sorbent and lack of availability of active sites for absorption.

FIG. 3 is a graph of the gas concentration of $CO_2$, $O_2$, and $N_2$ in the presence of the sorbent, diethanolamine bentonite (DEAB) as a function of time. The $CO_2$ concentration decreased to parts per million volume (ppm v) levels while the $N_2$ concentration increased. The sorbent was exposed to the gas mixture at point A. After approximately 50 minutes, "breakthrough", a rising concentration of $CO_2$ in effluent gas, occurred at point B. The $N_2$ gas concentration goes back to its original level with the "breakthrough" of $CO_2$. The oxygen ($O_2$) concentration remains unchanged. When the curve begins to rise above a $CO_2$ concentration of zero, the sorbent has become saturated with $CO_2$.

FIG. 4 is a graph of the sorption of $CO_2$ over a sorbent, diethanolamine bentonite (DEAB), in moles of $CO_2$ absorbed per kg of sorbent (calculated from breakthrough curves presented in FIG. 3) as a function of time. The absorption of the gas into the sorbent follows straight-line behavior, with the slope declining towards zero as the sorbent approaches saturation with the gas. The total uptake of $CO_2$ at breakthrough is about 1.2 moles of $CO_2$ per kilogram of the sorbent DEAB.

The breakthrough time per kilogram of DEAB sorbent under the conditions presented is ~39 minutes per gram (min/g) of sorbent or ~650 hours per kilogram (hr/kg).

2. Monoethanolamine Bentonite (MEAB)

The amount of MEAB sorbent used herein was 1.07 g.

Figure 5:
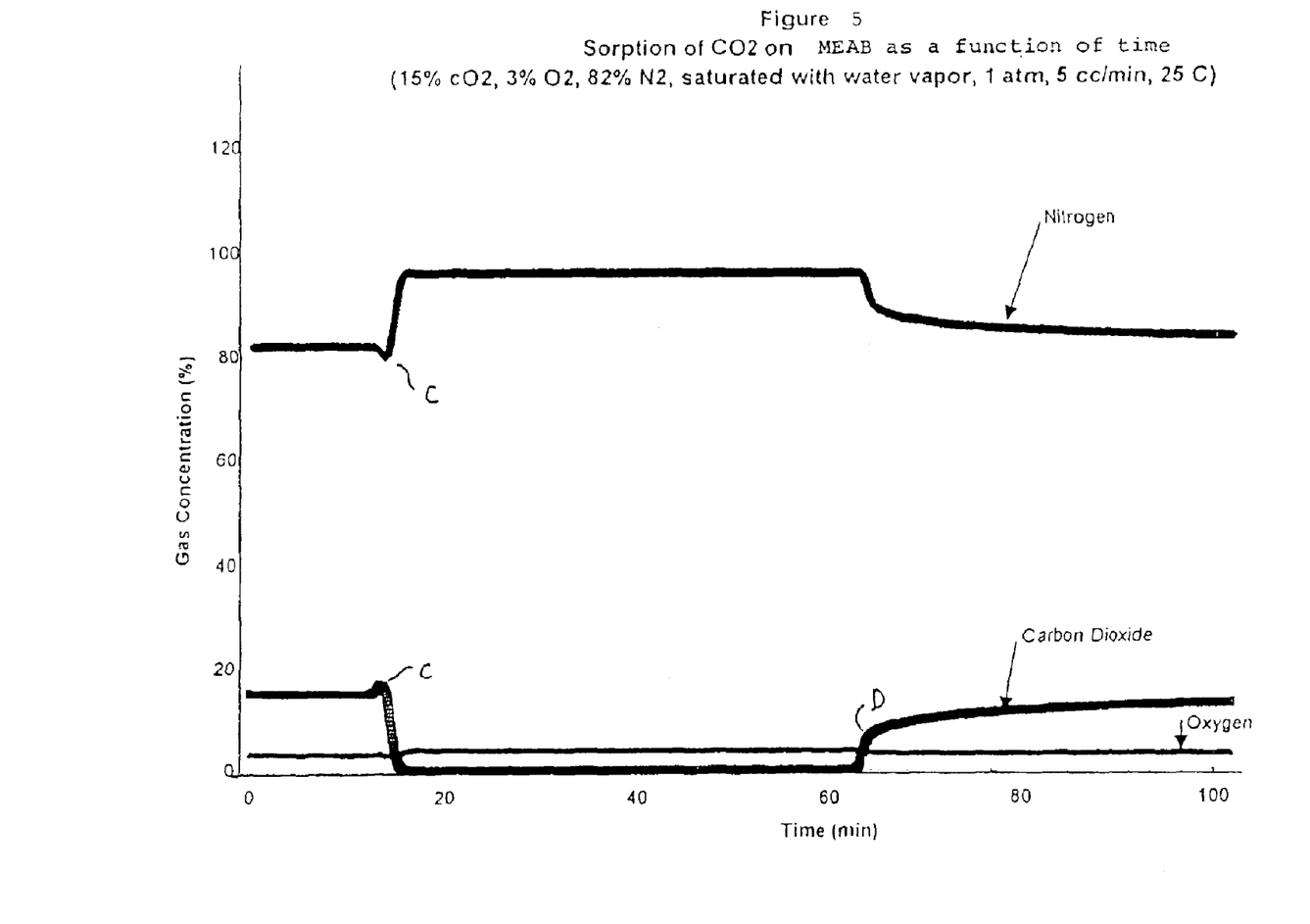
FIG. 5 is a graph of the gas concentration of $CO_2$, $O_2$, and $N_2$ in the presence of the sorbent, monoethanolamine bentonite (MEAB), as a function of time, in a controlled environment, in accordance with features of the present invention.

FIG. 5 is a similar graph of gas concentration of $CO_2$ and $N_2$ in the presence of the sorbent, monoethylamine bentonite (MEAB) as a function of time. The sorbent was exposed to the gas mixture at point C. Herein, breakthrough occurred at point D after more than sixty minutes. The total uptake of $CO_2$ at breakthrough is about 1.1 moles of $CO_2$ per kilogram of the sorbent MEAB.

The breakthrough time (see points C to D) of MEAB sorbent under the conditions presented is >42 min/g of sorbent or >700 hr/kg.

3. Diisopropanolamine Bentonite (DPAB)

Figure 6:
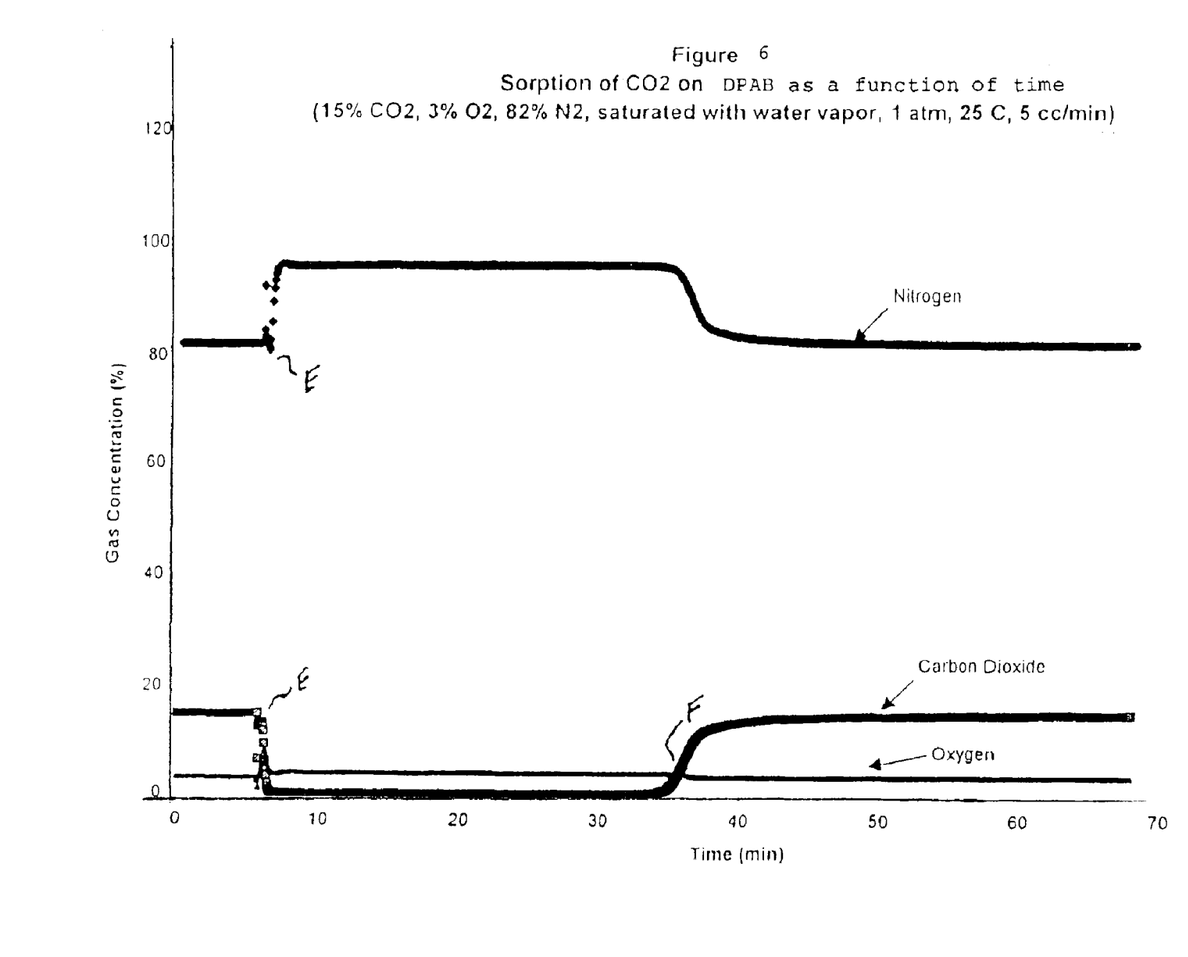
FIG. 6 is a graph of the gas concentration of $CO_2$, $O_2$, and $N_2$ in the presence of the sorbent, diisopropanolamine bentonite (DPAB), as a function of time, in accordance with features of the present invention.
Figure 9:
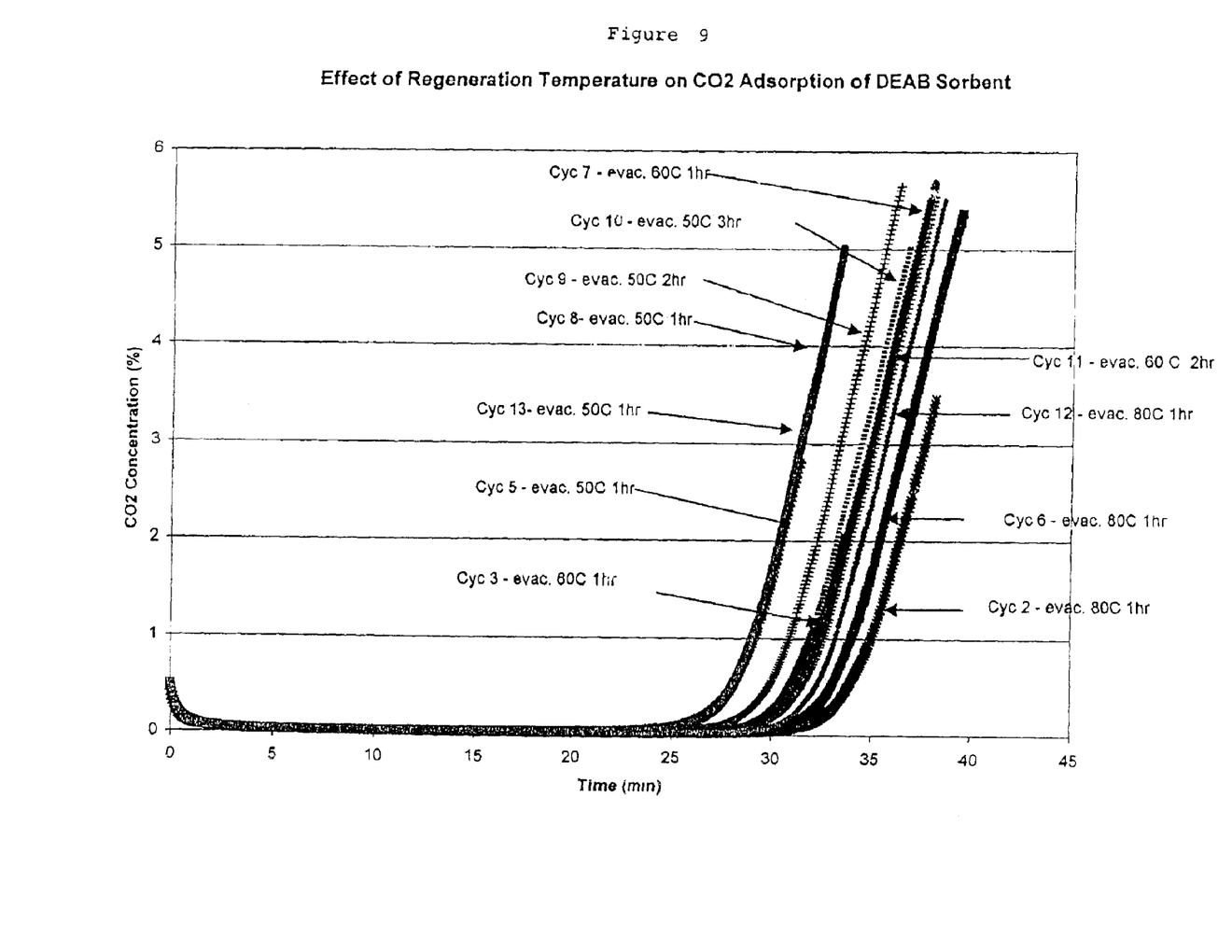
FIG. 9 is a graph of a thirteen-test cycle of breakthrough curves of $CO_2$ by the sorbent, diethanolamine bentonite (DEAB) as a function of time after regeneration of the sorbent at various temperatures, in accordance with features of the invention.

The amount of DPAB sorbent used for FIG. 6 and FIG. 9 infra was 1.35 g.

FIG. 6 is a similar graph of the gas concentration of $CO_2$ and $N_2$ in the presence of the sorbent, diisopropanolamine bentonite (DPAB), as a function of time. The sorbent was exposed to the gas mixture at point E. For DPAB, breakthrough occurred at point F after 35 minutes. The amount of $CO_2$ uptake at breakthrough is 0.55 mole of $CO_2$ per kilogram of the sorbent DPAB.

The breakthrough time (see points E to F) of DPAB sorbent under the conditions presented is 20 min/g of sorbent or 333 hr/kg.

4. Polyethylene Glycol Dimethyl Ether Bentonite (PEGDLB)

Figure 7:
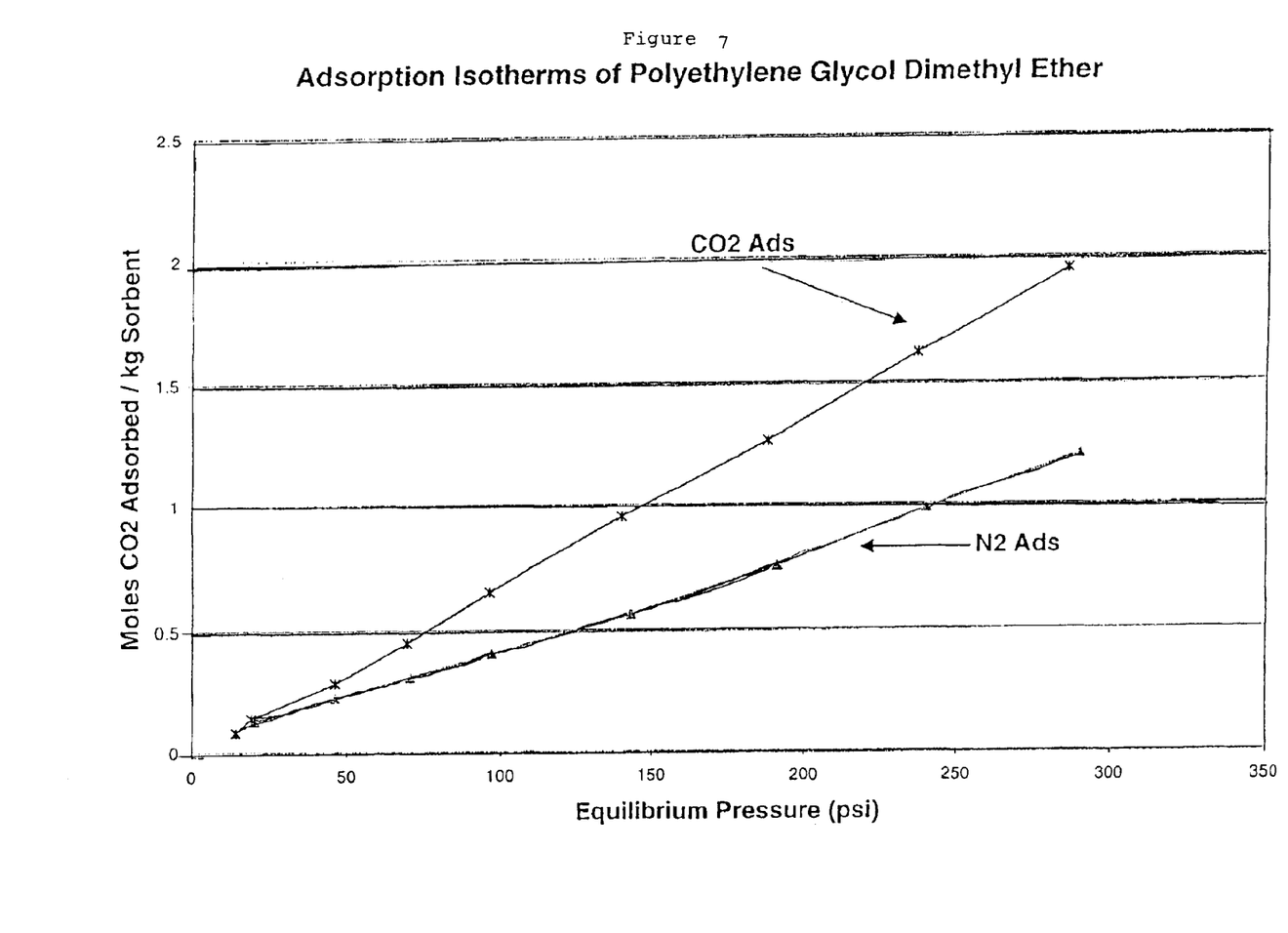
FIG. 7 is a graph of the adsorption isotherms of the sorbent polyethylene glycol dimethyl ether bentonite (PEGDLB) as a function of equilibrium pressure, in accordance with features of the present invention.

The amount of PEGDLB sorbent used for the data presented in FIG. 7 infra was ~7 g.

FIG. 7 is a graph of the adsorption isotherms of polyethylene glycol dimethyl ether bentonite (PEGDLB) in moles of gas absorbed per kilogram (kg) of sorbent, as a function of equilibrium pressure. As the equilibrium pressure is increased, the moles of gas absorbed per kg of sorbent increases. Here the absorption of $CO_2$ remains linear through a greater range of equilibrium pressures than for sorbents with different active components as described supra. The more linear behavior of PEGDLB as opposed to that of DEAB is most likely due to the difference between the interactions of the two active components with $CO_2$. PEGDLB physically absorbs (i.e., nonchemically reacts with) $CO_2$ by dissolving it; whereas, DEAB actually reacts chemically with $CO_2$ according to Equations 3 and 4 supra.

Sorbent Regeneration

Regeneration studies were carried out in a flow reactor using $N_2$ as a sweep gas to regenerate sorbents. Either an inert gas such as $N_2$ or a vacuum (<$10^{-1}$ Torr) can be used for sorbent regeneration in conjunction with mild heat (<50° C.).

Adequate regeneration can be obtained by heating used sorbents at 50° C. for one hour. However, $CO_2$ uptake capacity during subsequent sorption cycles for sorbents is higher when regeneration is performed at higher temperatures such as 60° C. or even 80° C. for one or even two hours. A higher regeneration time also results in a higher $CO_2$ uptake in subsequent sorption cycles.

Figure 8:
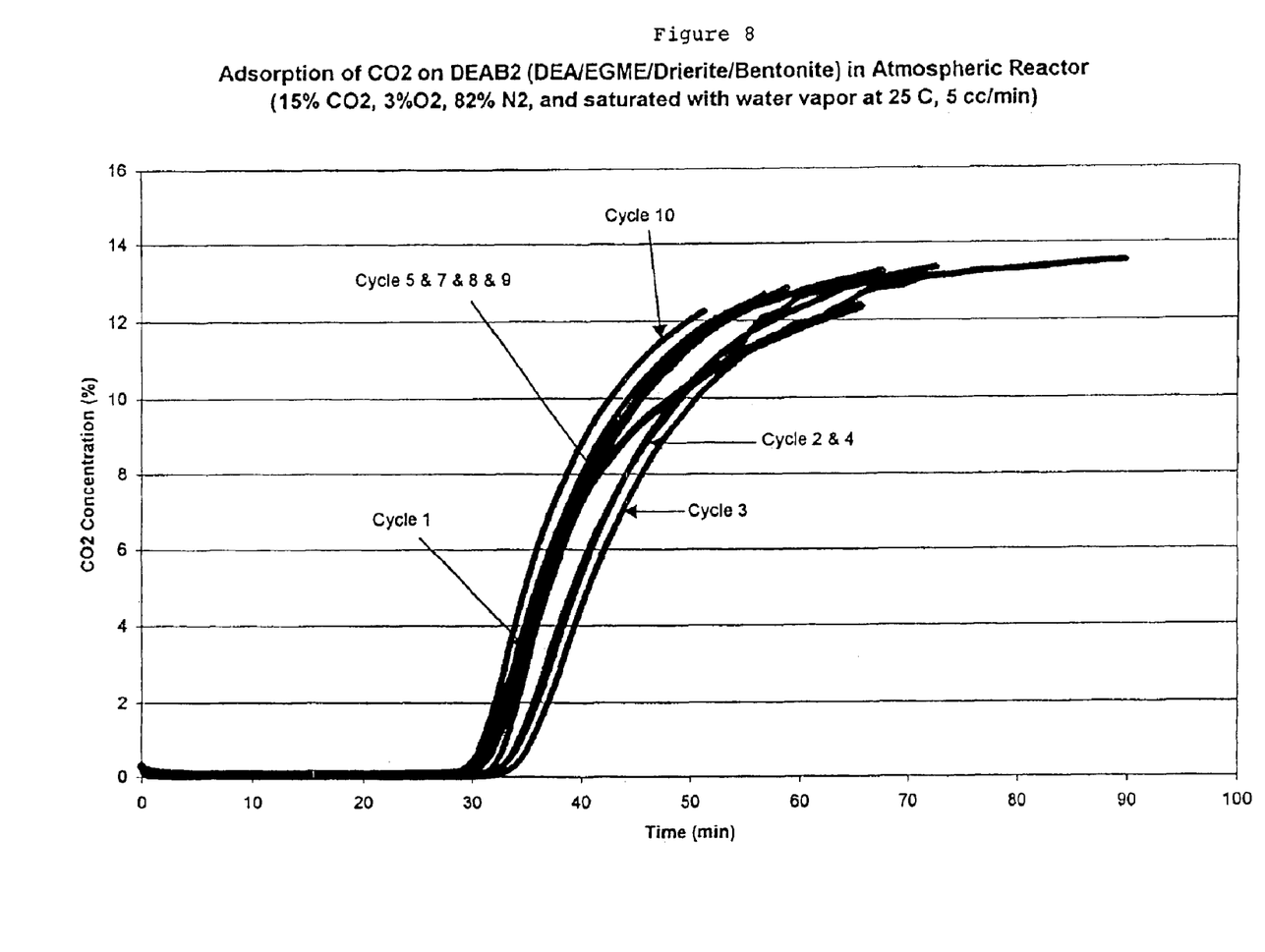
FIG. 8 is a graph of a ten-test cycle of breakthrough curves for the sorption of $CO_2$ by the sorbent, diethanolamine bentonite (DEAB), as a function of time after repeated regeneration of the sorbent at ambient temperature, in accordance with features of the present invention.

FIG. 8 depicts a ten-cycle test of DEAB. Regeneration was carried out at 38° C. while the used sorbent was purged with $N_2$. Very consistent data were obtained during this ten-cycle test. This indicates that sufficient regeneration can be achieved at 38° C. and the sorbent can be effectively used in subsequent cycles.

FIG. 9 depicts a thirteen-cycle test of 1.2 9 of DEAB. Regeneration was carried out at 50° C. (1, 2, and 3 hours), 60° C. (1 and 2 hours), and 80° C. (1 hour) while the used sorbent was purged with $N_2$. Each curve is labeled with the temperature at which regeneration was carried out and the time period for that regeneration. Very consistent $CO_2$ absorption or uptake was observed at a given regeneration temperature and heating time period, e.g., the breakthrough curves are very similar when the regeneration was carried out at 50° C. for 1 hour in cycles 5 and 8. This indicates that the sorbents can be effectively used for repeated cycles.

The $CO_2$ uptake capacity was greater when the regeneration was performed at a higher temperature. At a given temperature, higher regeneration time also resulted in higher $CO_2$ uptake in the following sorption cycle. Sufficient sorbent regeneration can be achieved at a temperature of 50° C. (1 hour).

Figure 10:
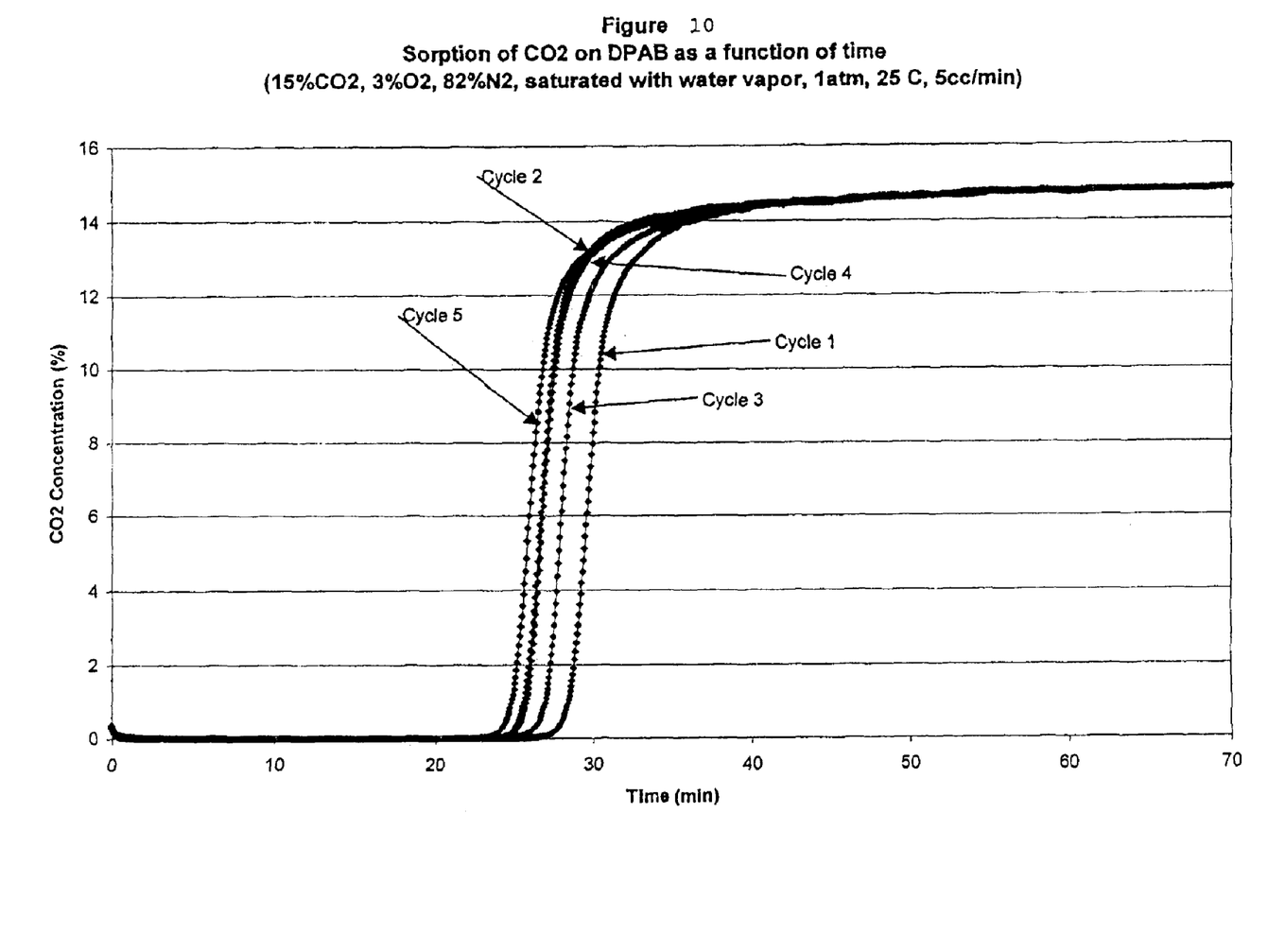
FIG. 10 is a graph of a five-test cycle of breakthrough curves for the sorption of $CO_2$ by the sorbent, diisopropanolamine bentonite (DPAB), as a function of time after repeated regeneration of the sorbent, in accordance with features of the present invention.

FIG. 10 depicts breakthrough curves in terms of the concentration of $CO_2$ from the gas mixture (15% v $CO_2$, 3% v $O_2$, 82% v $N_2$, saturated with water vapor) over the sorbent, diisopropanolamine bentonite (DPAB), as a function of time after repeated regeneration of the sorbent for a total of five cycles. There is a small decrease in the uptake of $CO_2$ at the second cycle when compared to the uptake of the first cycle, but the uptake is stable in subsequent cycles. Regeneration was performed overnight at ambient temperatures with $N_2$ as a purge gas.

The invented process is simple and quick, generates little or no waste products, thus providing an inexpensive product with little or no waste disposal problems.

These novel sorbents can be applied to an array of gaseous mixtures.

The sorbents' absorption properties are independent of their surface areas and depend, instead, upon their total volumes.

The absorption properties' dependence upon total volume allows the sorbent to incorporate a greater weight percentage of the gas into the sorbent.

The greater absorption capabilities of the sorbents gives rise to much longer breakthrough times for gases such as $CO_2$.

The sorbents can be easily regenerated and used for additional absorption/desorption cycles thus allowing for additional cost savings.

While the invention has been described with reference to details of the illustrated embodiment, these details are not intended to limit the scope of the invention as defined in the appended claims.

What is claimed is:

1. A method for removing compounds from a fluid, the method comprising contacting the fluid with a polar nucleophilic moiety located on inside surfaces and outside surfaces of a clay substrate having a surface area of 0.72 to 26 m²/g, whereby the moiety attracts the compounds.

2. The method as recited in claim 1 wherein the compound is a gas at ambient temperature, the gas selected from the group consisting of carbon dioxide, hydrogen sulfide, and combinations thereof.

3. The method as recited in claim 1 wherein the compounds are removed at a temperature of between 25° C. and 50° C.

4. The method as recited in claim 1 wherein the moiety attracts the compounds via chemisorption or physisorption.

5. The method as recited in claim 1 wherein the polar nucleophilic moiety is regenerated in situ by heating the substrate to temperatures ranging from between 35° C. to 100° C. in an inert atmosphere.

6. A sorbent comprising:
   a) a clay substrate having a surface area of 0.72 to 26 m²/g with external surfaces and internal surfaces in fluid communication with the environment; and
   b) polar nucleophilic moieties covering said surfaces to allow interaction of the moieties with compounds in the environment.

7. The sorbent as recited in claim 6 wherein the moieties are present in a moiety-to-substrate weight ratio ranging from 1:9 to 3:2.

8. The sorbent as recited in claim 6 wherein the substrate has a layered structure capable of expanding to form passages to contain said moiety.

9. The sorbent as recited in claim 6 further comprising inert materials to enhance porosity of the substrate.

10. The sorbent as recited in claim 6 wherein the clay substrate is selected from the group consisting of bentonite, ball clay, fuller's earth, kaolin, attapulgite, hectorite, meerschaum, palygorskite, saponite, sepiolite, common clay, and combinations thereof.

11. The sorbent as recited in claim 6 wherein the moieties are homogeneuosly dispersed thoroughout the substrate.

12. The sorbent as recited in claim 6 wherein the external surfaces are in fluid communication with the internal surfaces.

13. A process for producing enriched sorbents, the process comprising:
   a) supplying a clay substrate having a surface area of 0.72 to 26 $m^2/g$ and having repeating strata and interstices between the strata, whereby the interstices define conduits which are in fluid communication with the atmosphere surrounding the substrate;
   b) causing the interstices to expand;
   c) coating the strata with a polar nucleophilic moiety; and
   d) drying the coated strata.

14. The process as recited in claim 13 wherein the polar nucleophilic moiety is an amine selected from the group consisting of a primary amine, a secondary amine, a tertiary amine, an aromatic amine, or a cyclic amine.

15. The process as recited in claim 13 wherein the polar nucleophilic moiety is a substituted amine containing one or more moieties selected from the group consisting of methyl, ethyl, n-propyl, isopropyl, n-butyl, isobutyl, t-butyl, allyl, vinyl, cyclopentyl, cyclohexyl, phenyl, naphthyl, and combinations thereof.

16. The process as recited in claim 13 wherein the polar nucleophilic moiety is an ether containing one or more moieties selected from the group consisting of methyl, ethyl, n-propyl, isopropyl, n-butyl, isobutyl, t-butyl, allyl, vinyl, cyclopentyl, cyclohexyl, phenyl, naphthyl, ethylene glycol, polyethylene glycol, and combinations thereof.

17. The process as recited in claim 13 wherein the process is conducted at temperatures below 80° C.

18. The process as recited in claim 13 wherein the moiety facilitates sequestration of carbon dioxide.

19. The process as recited in claim 18 wherein the sequestration occurs on the exterior and in the interior of the substrate.

20. The process as recited in claim 13 wherein the absorption properties of sorbent produced are independent of the volume of the sorbent.

* * * * *

UNITED STATES PATENT AND TRADEMARK OFFICE
CERTIFICATE OF CORRECTION

PATENT NO. : 6,908,497 B1
DATED : June 21, 2005
INVENTOR(S) : Ranjani V. Siriwardane It is certified that error appears in the above-identified patent and that said Letters Patent is hereby corrected as shown below:

<u>Title page,</u>
Item [75], Inventors, should read -- Ranjani V. Siriwardane, Morgantown, WV 9US) --.

Signed and Sealed this

Twenty-seventh Day of December, 2005

JON W. DUDAS
*Director of the United States Patent and Trademark Office*